July 16, 1935.  H. L. MERRICK  2,008,030
WEIGHING AND MATERIAL FEEDING MEANS
Filed June 12, 1931   9 Sheets-Sheet 1
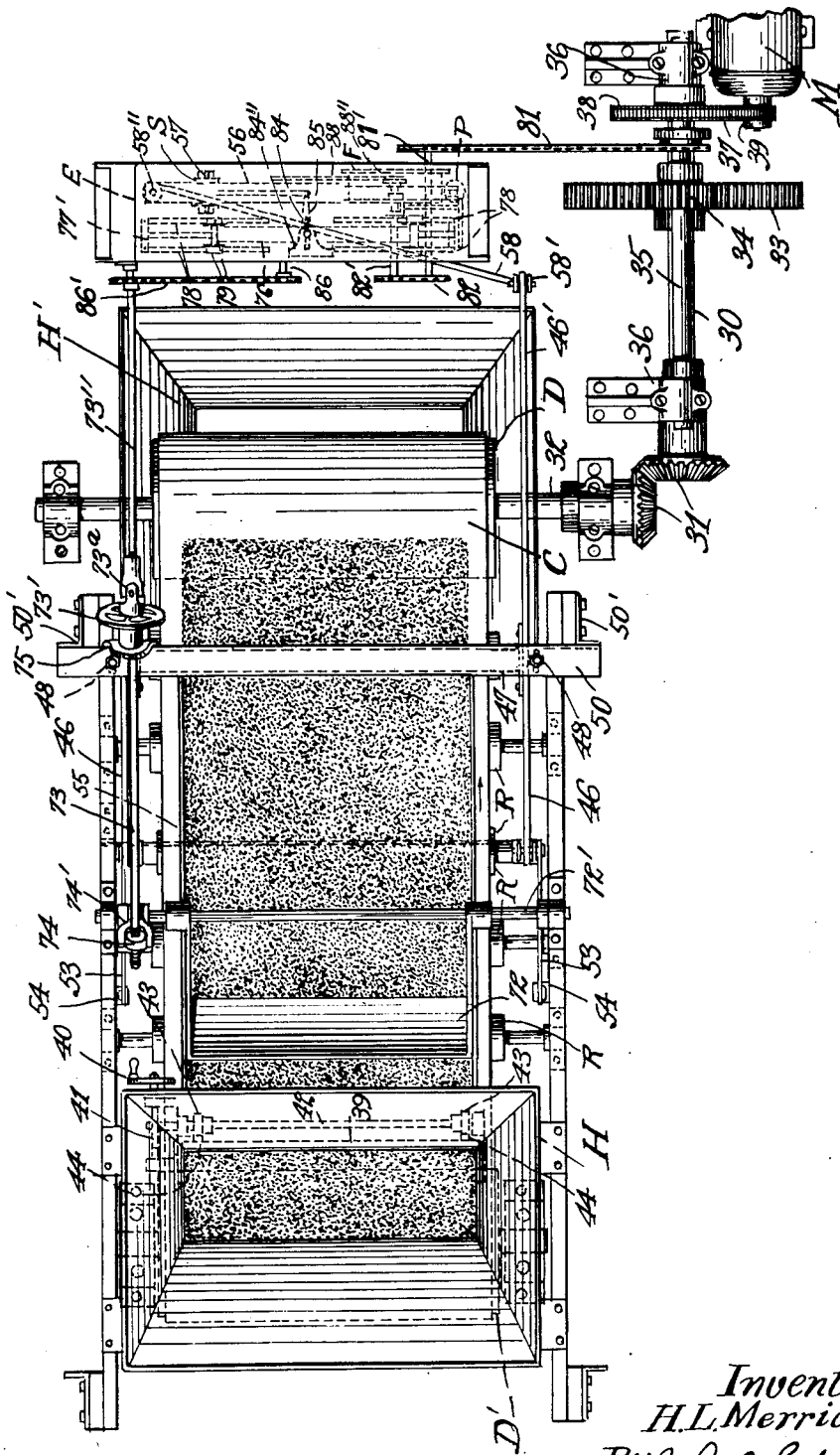
Inventor
H. L. Merrick
By John O. Seifert
Attorney

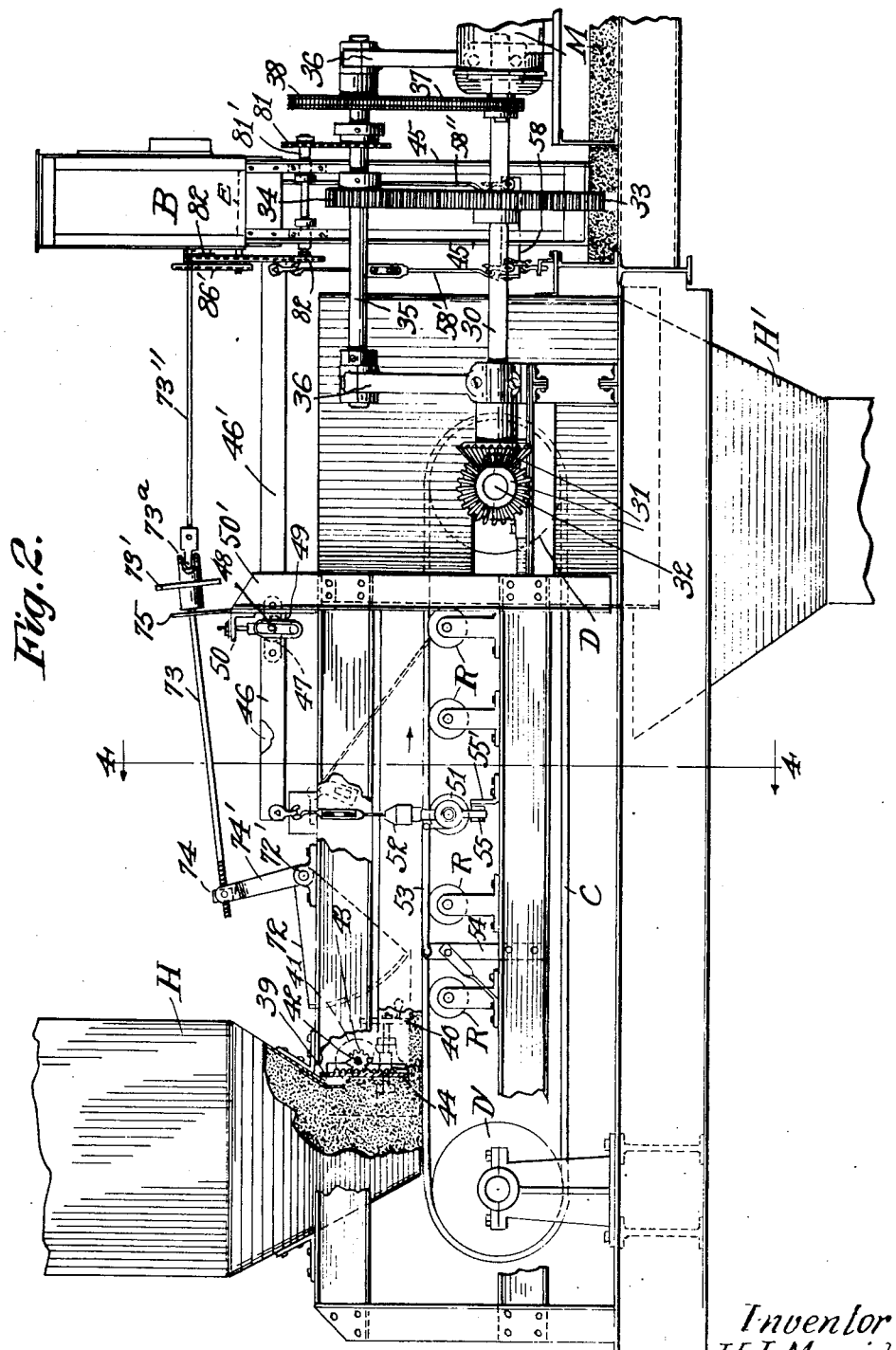

July 16, 1935.  H. L. MERRICK  2,008,030
WEIGHING AND MATERIAL FEEDING MEANS
Filed June 12, 1931  9 Sheets-Sheet 3
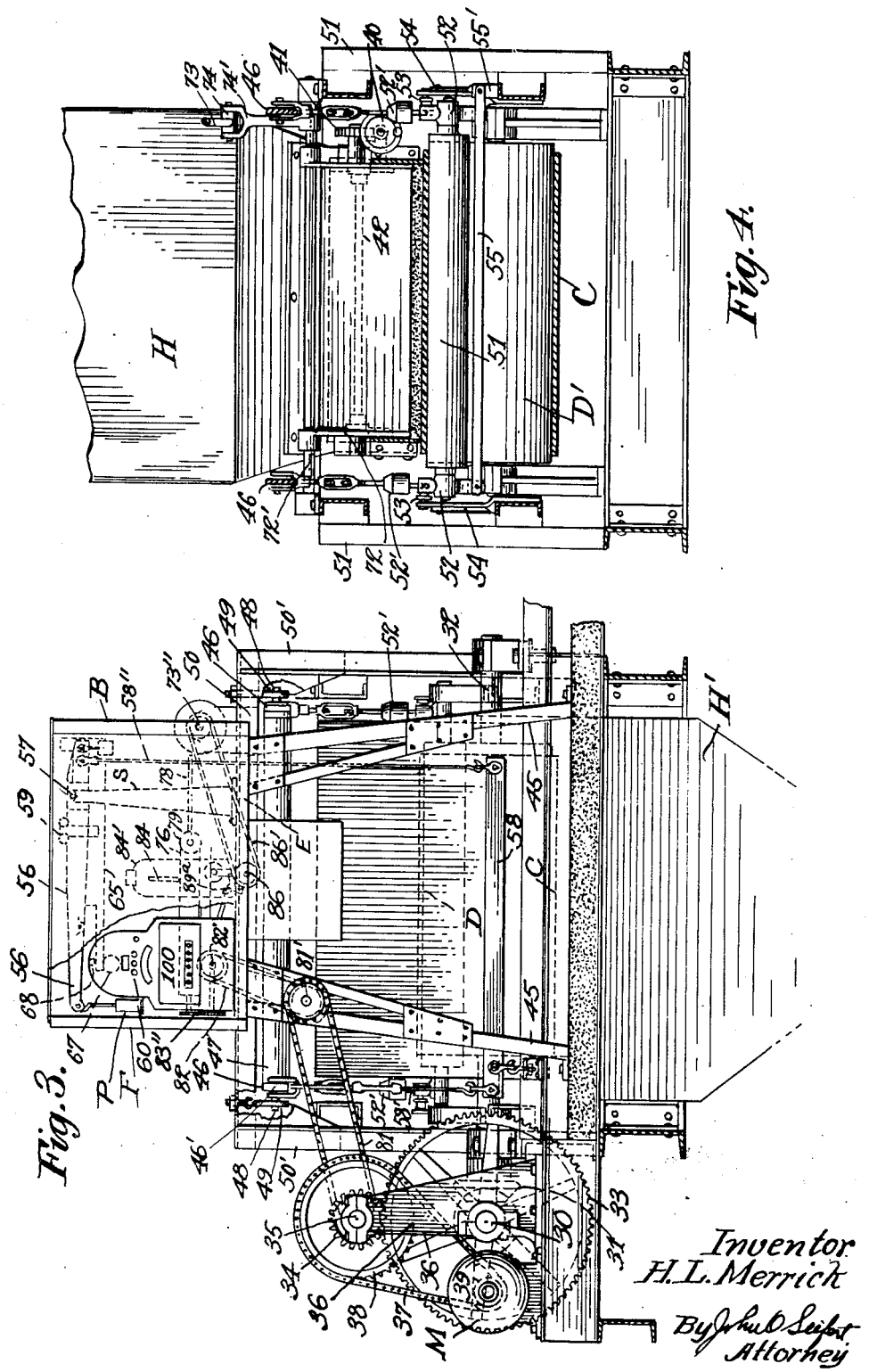

July 16, 1935.  H. L. MERRICK  2,008,030
WEIGHING AND MATERIAL FEEDING MEANS
Filed June 12, 1931  9 Sheets-Sheet 4
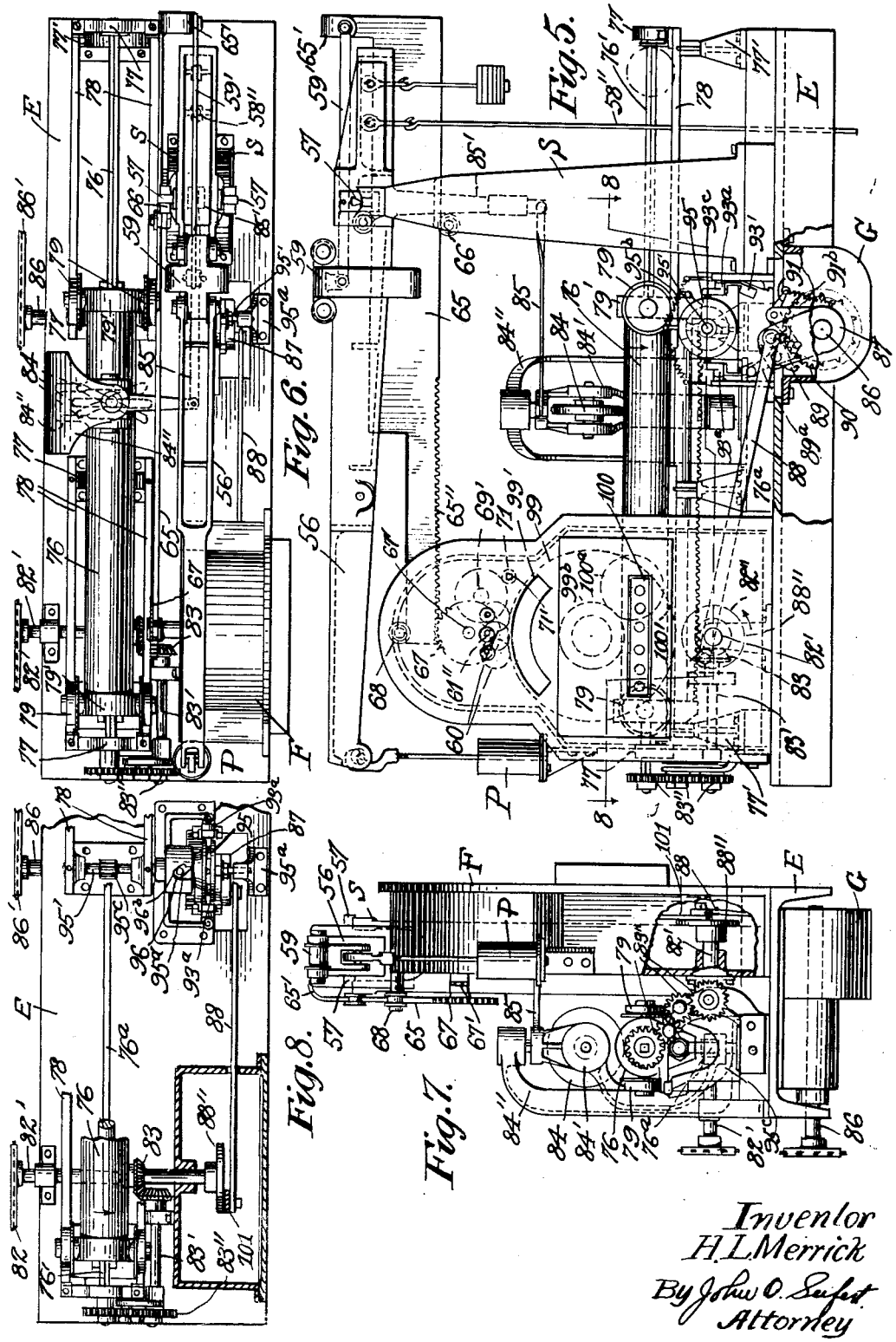
Inventor
H. L. Merrick
By John O. Seifert
Attorney

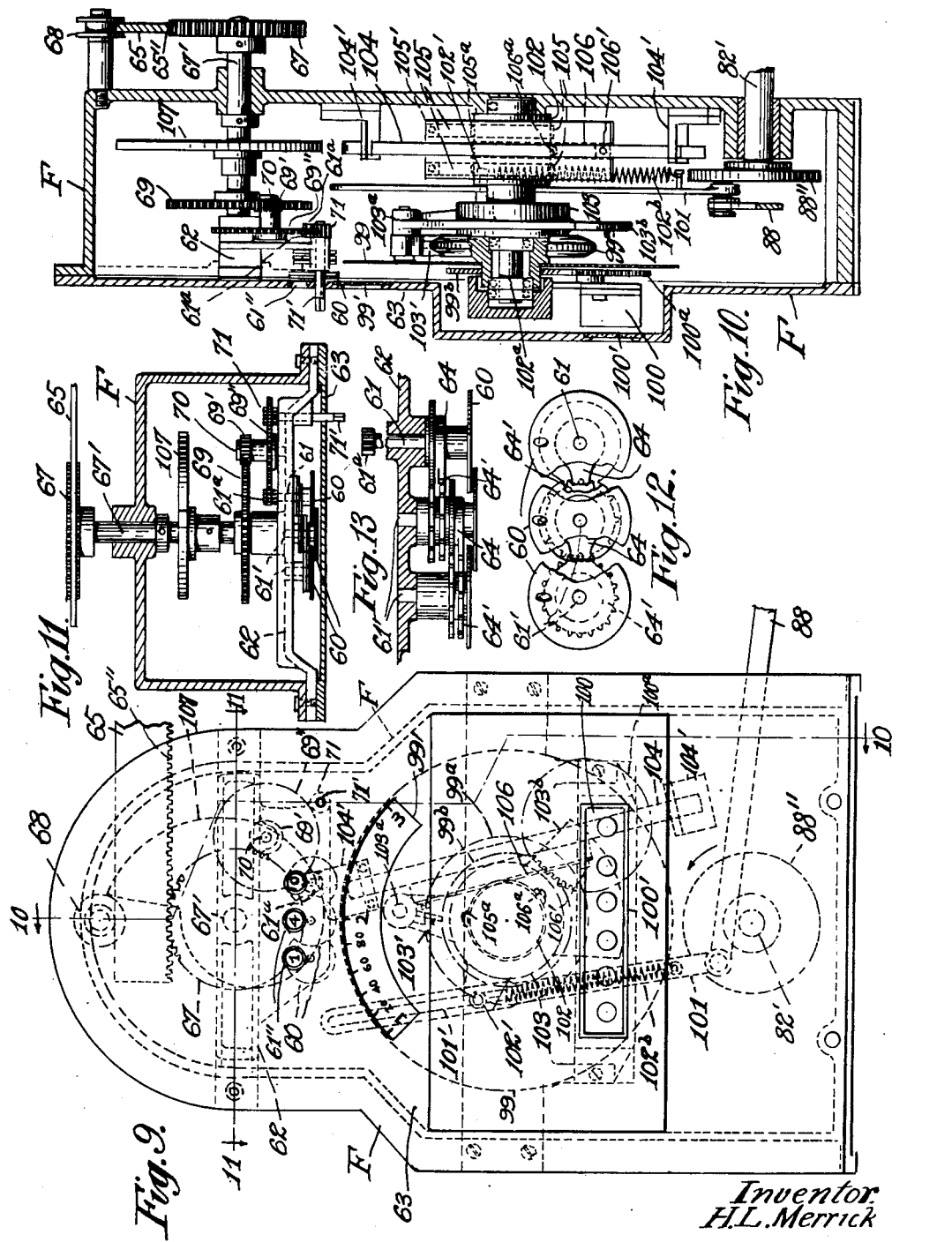

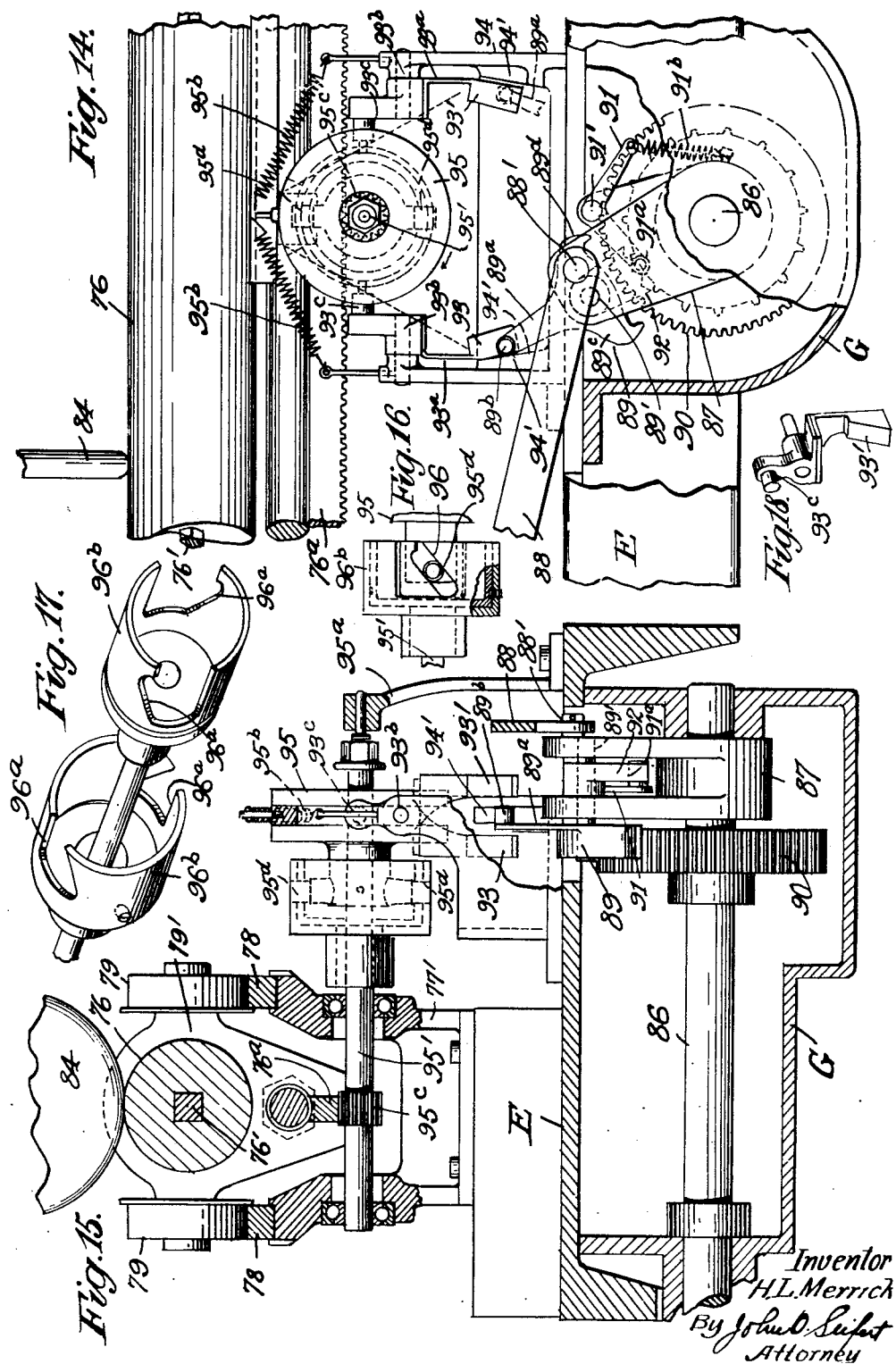

July 16, 1935.  H. L. MERRICK  2,008,030
WEIGHING AND MATERIAL FEEDING MEANS
Filed June 12, 1931  9 Sheets-Sheet 7
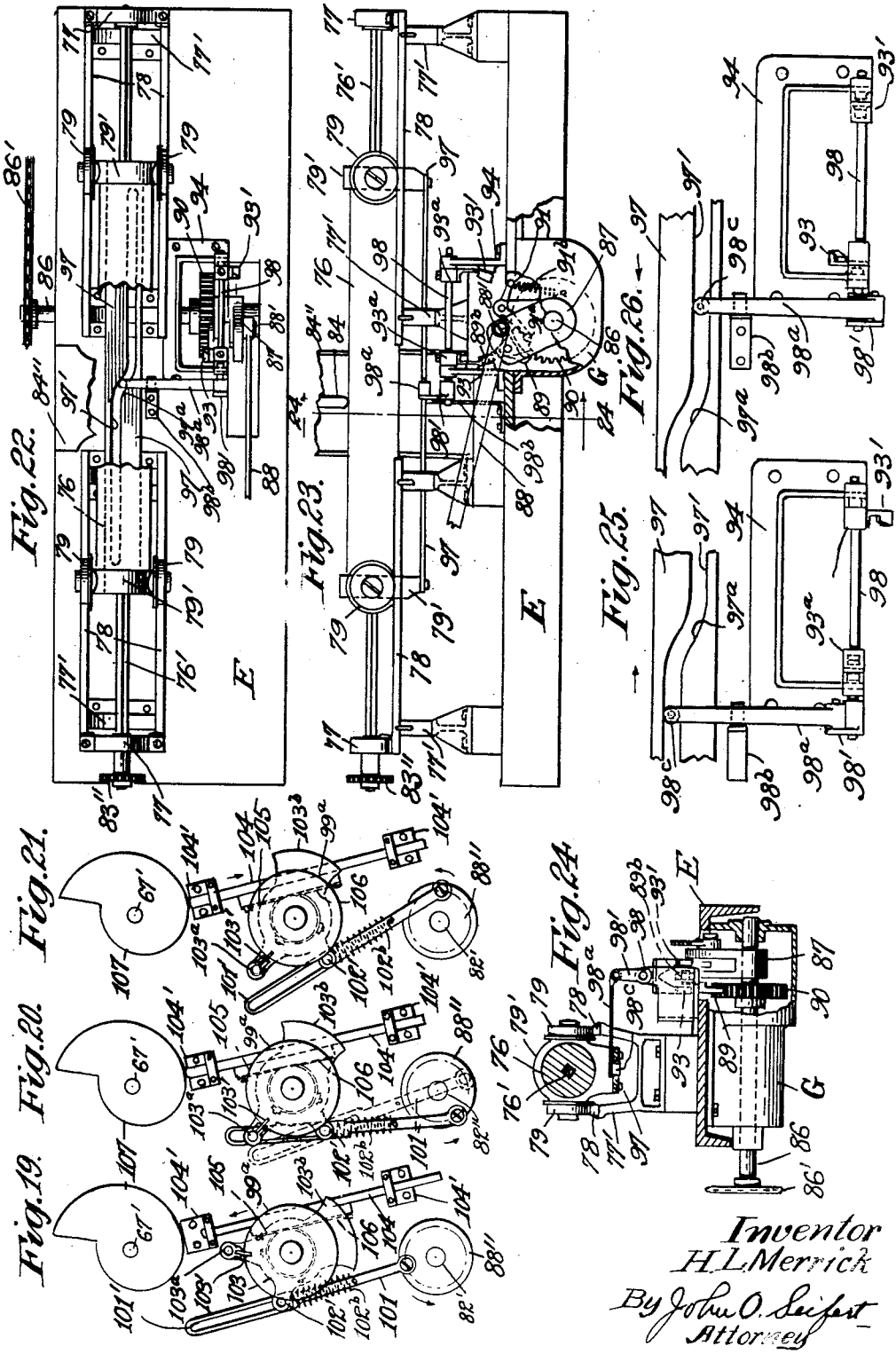
Inventor
H. L. Merrick
By John O. Seifert
Attorney

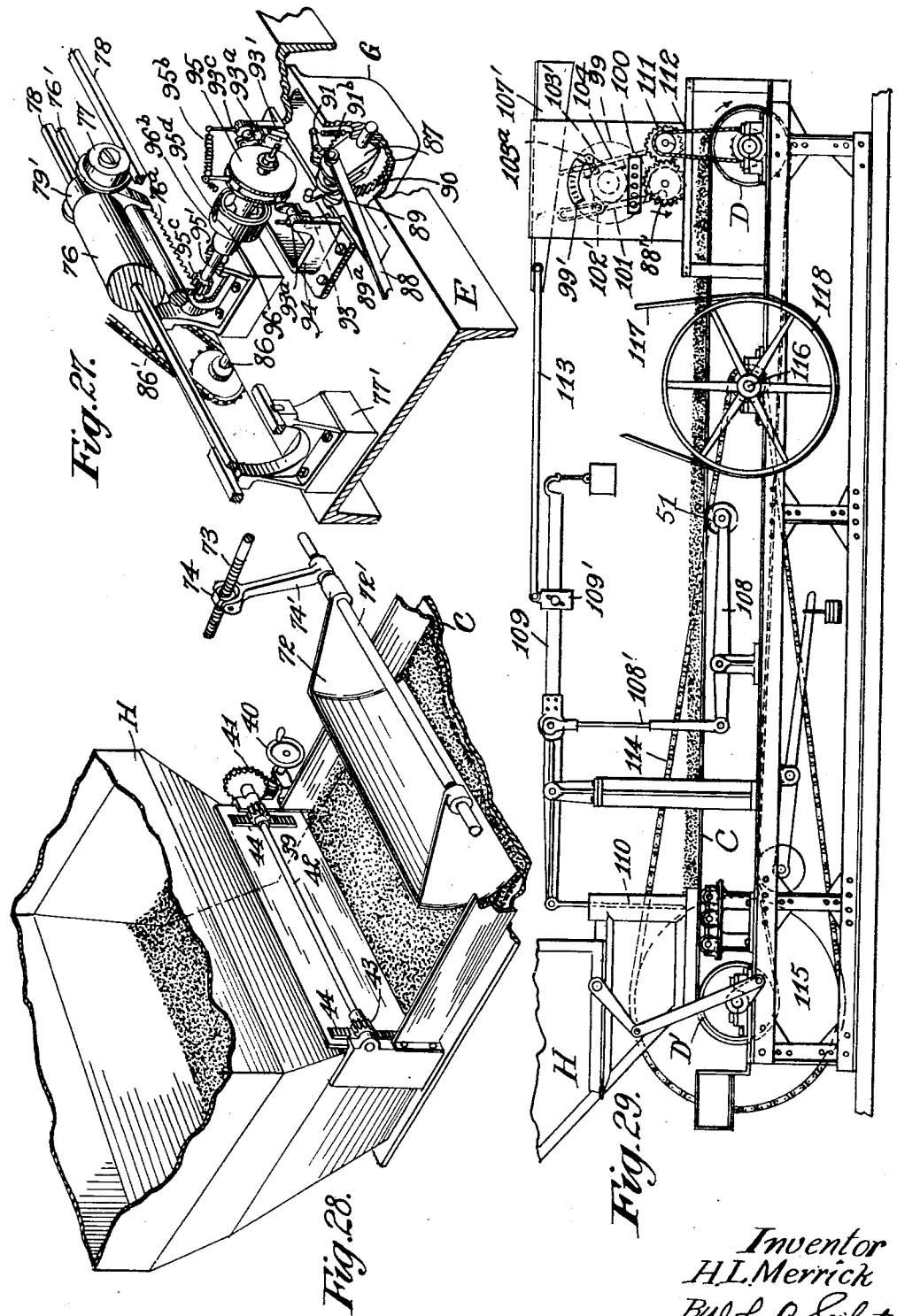

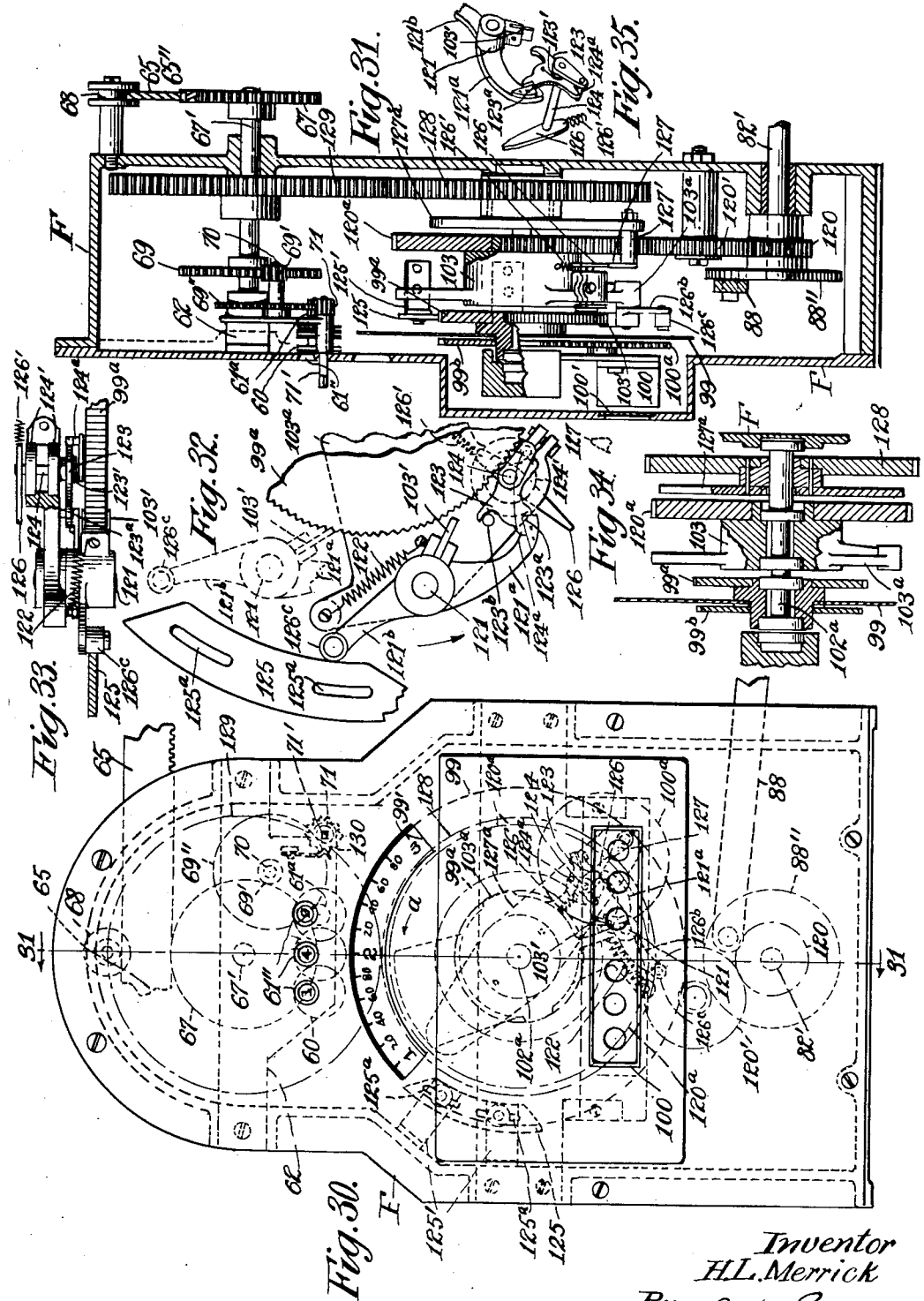

Patented July 16, 1935

2,008,030

UNITED STATES PATENT OFFICE 2,008,030

WEIGHING AND MATERIAL FEEDING MEANS

Herbert L. Merrick, Passaic, N. J.

Application June 12, 1931, Serial No. 543,860

29 Claims. (Cl. 265—28)

This invention relates to weighing mechanism wherein material to be weighed is delivered to the weighing mechanism and weighed in successive quantities of predetermined weight, and it is the principal object of the invention to provide in connection with weighing mechanism of this character, means to integrate the cumulative weight of the successively weighed quantities of material.

A further object of the invention relates to weighing mechanism wherein the material to be weighed is delivered to a material or load support of the weighing mechanism by means regulatable to deliver material in predetermined quantity to the load support of the weighing mechanism, and the weighing mechanism adapted to counterbalance such predetermined quantity of material and control the operation of means to adjust the delivery means to regulate the delivery of material to the support of the weighing mechanism to decrease the delivery of material to the load support of the weighing mechanism when the weighing mechanism is moved to overload position and to increase the delivery of material thereto when the weighing mechanism is moved to underload position, and to combine therewith means to integrate the cumulative quantity of material weighed.

Another object of the invention relates to weighing means wherein the material as it is weighed is transported by a traveling way or conveyer and the weighing means adapted to counterbalance successive quantities of material of predetermined weight transported by the conveyer with means to deliver the material in regulated quantity to the conveyer, and means to integrate the cumulative weight of the successive quantities of material transported by the conveyer and weighed.

A further object of the invention is to provide in apparatus of this character means to integrate the cumulative weight of material transported by the conveyer, and means operative from the conveyer travel to actuate said integrating means proportionally with the weight of a predetermined quantity of material to be transported by successive predetermined lengths of conveyer travel.

Another object of the invention is to provide in weighing mechanism of this character means to indicate the predetermined weight of the successive quantities of material to be weighed, and to provide adjustable counterpoise means to adapt the weighing mechanism to successively weigh quantities of material of different predetermined weights and simultaneously therewith adjust the indicating means to indicate the weight of the successive quantities of material to be weighed and to which the counterpoise has been adjusted to effect the weighing of such successive quantities.

Another object of the invention relates to adjustable means to regulate the actuation of the means to integrate the cumulative weight of material weighed, and means to adjust said regulating means proportionally with the adjustment of the counterpoise to weigh successive quantities of material of different predetermined weight, either combined with or without the adjustment of the means to indicate the weight of the successive predetermined quantities of material to be weighed.

A further object of the invention relates to improved means to adjust the means to regulate the delivery of material to be weighed controlled by the weighing mechanism, said means controlling means normally inactive and free of the weighing mechanism when the weighing mechanism is in position of equilibrium by a quantity of material of predetermined weight and adapted to be rendered active by the movement of the weighing mechanism to overload or underload positions.

In the drawings accompanying and forming a part of this application Figure 1 is a plan view of an apparatus embodying the invention.

Figure 2 is a side elevation partly broken away and partly in section to show some of the parts.

Figure 3 is an end elevation looking at the right of Figure 2.

Figure 4 is a cross secional view taken on the line 4—4 of Figure 2 looking in the direction of the arrows.

Figure 5 is a front elevation of the weighing mechanism, the cumulative weight registering and indicating means, the actuating means to adjust the means to regulate the delivery of material to the conveyer, and the means controlled from the weighing mechanism to render said actuating means active and inactive.

Figure 6 is a plan view of the parts shown in Figure 5.

Figure 7 is an end elevation of the parts shown in Figures 6 and 7 and looking at the left of Figure 6.

Figure 8 is a view taken substantially on the line 8—8 of Figure 5 looking in the direction of the arrows.

Figure 9 is a front elevation of the cumulative weight registering and indicating means, together with the indicator means to indicate the predetermined weight of material to be transported by each successive predetermined length of conveyer travel and the adjusting means for the indicator means, the counterpoise of the weighing mechanism and a calibrated stop member to control the actuating means for the actuation of the cumulative weight registering and indicating means.

Figure 10 is a sectional view taken on the line 10—10 of Figure 9 looking in the direction of the arrows.

Figure 11 is a sectional view taken on the line 11—11 of Figure 9 looking in the direction of the arrows.

Figure 12 is a front elevation, partly broken away, of the indicator means for indicating the predetermined weight of material to be transported by a predetermined length of conveyer travel.

Figure 13 is a view looking at the top of Figure 12 to show the arrangement of the digit carrying wheels and showing the mounting for the support for said wheels in section.

Figure 14 is a detail view in front elevation and on an enlarged scale of the actuating means for the adjusting means for the means to regulate the delivery of material to the conveyer, and the means controlled from the weighing mechanism for rendering said actuating means active and inactive.

Figure 15 is a cross sectional view of the parts shown in and looking at the left of Figure 14.

Figure 16 is an elevational view of a part of the means controlled by the weighing mechanism for rendering active and inactive the actuating means for the adjusting means for the regulating means for delivering material to the conveyer.

Figure 17 is a perspective view, on an enlarged scale and shown in dissembled relation, of the parts shown in Figure 16.

Figure 18 is a perspective view of an adjustable trip for rendering active the actuating means for the adjusting means for regulating the delivery of material to the conveyer.

Figures 19, 20 and 21 are detail views of the actuating means for the cumulative weight registering and indicating means and the means adjustable with the counterpoise of the weighing mechanism to control the operation of said actuating means and showing the parts in different positions.

Figure 22 is a plan view of modified means controlled by the weighing mechanism shown in connection with and for rendering active and inactive the adjusting means for the means for regulating the delivery of material to the conveyer.

Figure 23 is a front elevational view of the parts shown in and looking at the bottom of Figure 22.

Figure 24 is a cross sectional view taken on the line 24—24 of Figure 23 looking in the direction of the arrows.

Figures 25 and 26 are detail views on an enlarged scale of the means controlled by the weighing mechanism for rendering active and inactive the adjusting means for the means regulating the delivery of material to the conveyer.

Figure 27 is a perspective view of the means shown in Figures 5 to 7 controlled from the weighing mechanism, to render active and inactive the adjusting means for regulating the delivery of material to the conveyer.

Figure 28 is a perspective view of a portion of the means to deliver material to the conveyer and showing in relation thereto adjustable means for regulating the delivery of material to the conveyer.

Figure 29 is a side elevation of a simplified arrangement of combined material feeding and weighing mechanism with my improved means to register and indicate the cumulative weight of material delivered by the conveyer.

Figure 30 is a view similar to Figure 9 showing modified means for actuating the cumulative weight registering and indicating means.

Figure 31 is a sectional view taken substantially on the line 31—31 of Figure 30 looking in the direction of the arrows.

Figure 32 is a detail view, on an enlarged scale, of pawl and ratchet mechanism for advancing the weight registering means and showing the means for releasing the actuating pawl from the ratchet wheel and the means for releasably retaining the pawl in said position.

Figure 33 is a view of the parts shown in Figure 32 looking at the top of said figure.

Figure 34 is a sectional detail view to show the mounting and arrangement of the parts of the register actuating means; and Figure 35 is a perspective view of the releasable means for retaining the pawl out of operative relation with the ratchet wheel.

In the embodiment of apparatus illustrated for carrying out the invention there is provided a material or load support shown as a travelling way or conveyer C in the form of an endless belt passed around and supported by drums D, D' and the material being transported by the upper stretch of the conveyer, which is supported by rollers R rotatably carried by brackets fixed upon the framework of the apparatus, as shown in Figure 2. The conveyer is driven from a suitable source of power, shown as an electric motor M, operatively connected with the drum D through a shaft 30 having a bevel gear connection 31 with the shaft 32 of the drum D to drive the conveyer in the direction indicated by the arrow. The shaft 30 is driven by a gear 33 fixed on the shaft meshing with a pinion 34 fixed to a shaft 35 journaled in brackets 36 mounted upon the framework, the latter shaft being operatively connected with and driven from the motor by a sprocket chain 37 passing around a sprocket wheel 38 on said shaft and a sprocket wheel on the motor shaft.

Material is delivered to the conveyer from a hopper H, the outlet of which is regulated by an adjustable gate 39 to vary the delivery of material from the hopper. The gate is adjustable by a hand wheel 40 fixed to a shaft having a worm thereon meshing with a worm wheel, as at 41, the worm wheel being fixed to a shaft 42 having pinions 43 thereon meshing with racks 44 mounted upon the gate. The material is delivered from the conveyer to a hopper inlet H' of a chute leading to a receiver (not shown) with the end wall of the hopper and a portion of the side walls extended upward above the conveyer to direct the material from the conveyer into the hopper and prevent spilling of the material.

To weigh the material transported by the conveyer a portion of the conveyer is supported from a weighing lever or beam constituting a part of weighing mechanism arranged at the delivery end of the conveyer and encased in a housing B supported by uprights 45 from the supporting base for the framework. The weighing mechanism embodies an arrangement of compound weighing levers one of which levers (Figures 1 to 4) from which a portion of the conveyer is suspended, comprising a pair of arms 46 extended in parallel relation from the ends of an arm connecting member 47 having knife edge pivots 48 extended axially from the opposite ends engaging bearing members 49 suspended from a cross-bar 50 fixed to uprights 50' of the framework. A portion of the conveyer is supported from the arms 46 by a roller 51 interposed between the rollers R, and rotatable in bearings 52 suspended by adjustable hangers 52' from the ends of said arms. To hold the roller against movement in the direction of travel of the conveyer by the force of the conveyer exerted on the roller the roller bearings are connected by links 53 to brackets 54 fixed upon the framework, and to hold the roller against lateral swaying movement a link 55 (Figure 4) is pivotally connected at one end with one of the roller bearings, the link extending below and parallel with the roller and pivotally connected at the opposite end to a bracket 55' mounted on the framework. The other arm 46' of the weighing beam or lever extends oppositely to the arms 46 from the connecting portion 47 and is connected with the main weighing lever 56 of the weighing mechanism, said main weighing lever having a pivotal support 57 intermediate its ends upon standards S mounted upon the base E of the weighing mechanism, (Figures 5, 6 and 7), through an intermediate lever 58 connected at one end to and suspended from one end of the lever arm 46' by an adjustable link 58', and connected with and suspended from the opposite end by a link 58'' from one end of the lever 56. To counterbalance quantities of material of different predetermined weight transported by the portion of the conveyer supported from the weighing mechanism adjustable counterpoise weight 59 is provided, said counterpoise having a roller support upon the lever 56. To prevent undue chattering or vibrating of the weighing lever 56 a dash pot P is provided the plunger of which is connected with the end of the lever opposite to that at which the conveyer supporting lever 46' is connected, as shown at P in Figure 6.

To indicate the predetermined weight of material transported by successive predetermined lengths of conveyer travel indicator mechanism is provided (Figures 9 to 13), which may comprise a series of digit carrying wheels or disks, and in the present instance including three disks 60, each disk having circumferentially disposed digits from 0 to 9, the unit digit wheel being mounted on a shaft 61 rotatably mounted in a support 62, while the disks of higher denomination are rotatably mounted on studs 61' fixed in said support, the support being mounted in an opening in the front of a housing F, as shown in Figure 11, in relation to alined windows 61'' in a closure plate 63 for the opening, as shown in Figure 9. The movement of the digit wheels of lower denomination upon each revolution thereof as usual is transmitted to the wheel of next higher denomination by a toothed sector 64 rotatable with the wheels of lower denomination, such as the unit and tens wheels, and adapted to engage a toothed wheel 64' rotatable with the wheel of next higher denomination.

The indicator is adjustable simultaneously with the setting of the counterpoise to counterbalance a predetermined quantity of material to be transported by each successive predetermined length of conveyer travel, said means (Figures 5, 6, 7 and 8 to 11) comprising a bar 65 connected with the counterpoise 59 to participate in the movement thereof and extend parallel with the weighing lever 56 by a link 59' pivotally connected at one end to the counterpoise and at the opposite end to a portion extended laterally through one end of the bar bent to arcuate shape in cross section as at 65'. The bar is slidably supported in vertical edgewise position by a roller 66 rotatably carried by a lever supporting standard S and has rack teeth 65'' meshing with a gear 67 fixed to a shaft 67' (Figures 10 and 11) rotatably mounted in the casing F and the indicator support 62, and held in mesh therewith by a grooved roller 68 engaging the edge of the bar opposite to the rack teeth, said roller being rotatably mounted on a stud fixed in and extended from the casing F. A gear 69 fixed on the shaft 67' meshes with a pinion 69' rotatable with a gear 69'' on a stud 70 fixed in the support 62 for the shafts of the indicator disks 60, and the gear 69'' meshing with a pinion 61a fixed to the shaft 61 of the prime mover or unit digit wheel 60 of the indicator and with a pinion 71 fixed to the end of a shaft 71' rotatably mounted in the indicator support 62, the opposite end of which shaft is extended through an opening in the closure plate 63 for the casing F and arranged for the engagement of a key to rotate the shaft. The ratio of the gearing is such that when the shaft 71 is rotated movement is imparted to the rack bar 65 and thereby the counterpoise is adjusted along the weighing lever 56, and simultaneously therewith the indicator disks 60 are proportionally adjusted to indicate the weight of the material to be transported by each successive predetermined length of conveyer travel and to which weight the counterpoise has been set.

To regulate the delivery of material to the conveyer substantially equal to the weight of the material to be transported thereby a gate or scraper 72 is provided, said scraper being positioned above and extending transversely of the conveyer forward of the hopper outlet controlling gate 39. The scraper is substantially of U shape with the connecting portion of the legs of the U of arcuate shape in cross section and it is fixed to a shaft 72' rotatably mounted upon the framework and adapted to be adjusted in a direction toward and away from the conveyer. The scraper is adjusted proportionally with the adjustment of the counterpoise of the weighing mechanism to effect a delivery of material approximately equal to the weight of the material to be transported by the successive conveyer lengths by means of a shaft 73 having a threaded connection with a block 74 pivotally carried to have movement on an axis transverse to the axis of the shaft in a bifurcation of an arm 74' fixed to the scraper carrying shaft. The shaft 73 is rotatably mounted in a bearing member 75 fixed to and extended upward from the cross-bar 50. To effect adjustment of the gate manually the shaft is provided with a hand wheel 73'.

Means are provided to automatically adjust the gate 72 to effect a decrease or increase in the delivery of material to the conveyer, and said adjustment being controlled by the movement of the weighing mechanism to overload or underload positions, said means also indicating variations in the quantity of material delivered to and transported by the successive predetermined lengths of conveyer travel from the load of predetermined weight to be transported by the successive lengths of conveyer travel. This means, as shown in Figures 5 to 8 and 14 to 18, comprises a drum 76 mounted on a shaft 76' shown of rectangular shape in cross section, to rotate with the shaft and have movement longitudinally or axially thereof, the shaft being journaled at the ends in bearings 77' mounted on supports 77' secured upon the base E for two pairs of track rails 78 for tractional engagement carried by rollers or wheels 79 of heads 79' connected to and in which the drum 76 is rotatably mounted. The drum is continually rotated from a suitable source of power, in the present instance from the conveyer driving motor M, (Figures 1 and 3,) by a sprocket chain 81 passing around a sprocket wheel on the shaft 35 and a sprocket wheel on a shaft 81', and a sprocket chain 82 passing around a second sprocket wheel on the shaft 81' and a sprocket wheel on a shaft 82' mounted in bearings upon the base E and having a bevel gear connection 83 with a shaft 83' having a gear train connection 83'' with the drum rotating shaft 76'. A disk 84 is rotatably supported in a carrier 84' to frictionally engage the drum 76 by gravity through the weight of the carrier 84', and the carrier is mounted in a bracket 84'' to have movement on an axis transverse to the axis of the disk and in the direction of said axis. A link 85 is pivotally connected at one end with the disk carrier and at the opposite end is connected in line with the pivotal support of the beam 56 with an arm 85' extended downward from the beam between the beam supports S. With the weighing mechanism in equilibrium or counterbalancing a load transported by the portion of the conveyer supported thereby the disk 84 will rotate in the plane of rotation of the drum. Should the weighing lever be moved to overload or underload positions the disk carrier will be correspondingly adjusted about its axis through its link connection 85 with the weighing lever and the disk 84 will be moved to either one of the dotted line positions shown in Figure 6 and rotate in angular relation to the plane of rotation of the drum and exert a force upon the drum to move it longitudinally in the direction of its axis with its wheel support 79 upon the track rails 78 and said movement of the drum will render mechanism active to effect rotation of a shaft 73'' (Figures 1 and 2) which in effect is a section of the gate or scraper adjusting shaft 73 to which it is connected by a universal joint 73a, the position of the drum in relation to the disk indicating whether or not the quantity of material delivered to the conveyer is of the predetermined weight to be transported by the successive predetermined lengths of conveyer travel. This means comprises a shaft 86 journaled in a casing G suspended from the bottom of the supporting base of the weighing mechanism (Figures 14 and 15) operatively connected with the shaft section 73'' by a sprocket chain 86' (Figure 2) passing around sprocket wheels on said shaft 86 and the shaft section 73'' of the scraper adjusting shaft. To impart rotative movement to the shaft 86 and the scraper or gate adjusting shaft 73, 73'' in either direction and thereby effect adjustment of the scraper gate 72 through the threaded connection thereof with the shaft section 73 a rocker 87, (Figures 14 and 15,) in the form of a pair of parallel connected arms is loosely mounted on the shaft 86 and is continuously oscillated by a rod 88 having a pivotal connection 88' with one arm of the rocker and pivotally connected at the opposite end eccentrically with a disk 88'' (Figures 5, 8 and 30) fixed to the driving shaft 82' of the driving gear train for the drum 76. A pawl 89 (Figures 14 and 15) having a pair of oppositely extending pallets 89c, 89b is pivotally supported intermediate the pallets by fixing the same upon the projecting end of a stud 89' rotatably carried by the rocker arms and having an arm 89a extended laterally and upwardly from its support upon said shaft. The pawl is adapted to be retained in position with the pawl pallets out of engagement with a toothed wheel 90 on the shaft 86, or with either of the pallets in engagement with a tooth of said wheel, by a yielding detent in the form of an angle lever 91 pivotally mounted on one of the arms of the rocker 87 as at 91', one arm of the lever carrying a roller 91a and the lever urged by a spring 91b to engage the roller with either one of three notches in the end of an arm 92 fixed to the pawl carrying stud 89' between the arms of the rocker and extending oppositely to the pawl arm 89a. The detent normally with the weighing mechanism in equilibrium engages the intermediate notch of the arm 92 with the pawl pallets out of engagement with the toothed wheel 90. Means are provided to actuate the pawl whereby one of the pallets will be engaged with the toothed wheel 90 and rotate the same upon each oscillation of the rocker 87, and said pawl actuating means being controlled by the movement of the weighing mechanism to overload or underload positions. This means, as shown in Figures 5 to 8 and 14 to 18, comprises a pair of trips 93, 93' arranged on one arm of lever members 93a pivotally supported, as at 93b, at the ends of and within the legs of a bifurcated member 94 mounted upon the base of the weighing mechanism to have movement on an axis extending in the plane of movement of the pawl arm 89a. The opposite ends of the levers carry studs 93c engaging in a peripheral groove of a wheel 95 loosely and slidably mounted on a shaft 95' journaled in a support 77' for the track rails 78 for the drum supporting wheels 79 and a bracket 95a fixed upon the base of the weighing mechanism. The wheel 95 is yieldingly urged to position by springs 95b with the groove in the wheel and the lever studs 93c in line with the plane of movement of a roller 89b carried by the pawl arm 89a with the trips 93, 93' normally positioned out of the path of movements of said roller, as shown in Figure 15. In this position of the trips the roller 89b will pass the trips, as shown at the left in Figure 14, and will engage either one of a pair of fixed stops 94' on the inner sides of the legs of the bifurcated member 94 thereby moving and maintaining the pawl 89 with the detent roller 91a engaging the intermediate notch of the detent 92 and retaining the pawl in position with the pawl pallets out of engagement with the teeth of the wheel 90 during the oscillation of the lever 87. Should the weighing mechanism be moved to underload position by the delivery of a quantity of material of a weight less than the predetermined weight to be transported by the conveyor and as indicated by the indicator dials 60 the shaft 95' will be rotated in one direction due to the longitudinal movement transmitted to the drum 76 and a rack 76a carried by the drum supporting heads 79' meshing with a pinion 95c on the shaft, and said movement of the shaft 95' being transmitted to rearward sliding movement of the wheel 95 by studs 95d carried by and extending oppositely from the hub of wheel 95 engaging in cam slots 96 (Figure 16) formed by recesses 96a in a pair of cup and nested members 96b fixed upon the shaft 95', said cup members being shown in dissembled relation in Figure 17 and in assembled and nested relation in Figure 16. This rearward movement of the wheel 95 through the connection of the levers 93a therewith rocks said levers and positions the trip 93 in the path of movement of and for engagement by the roller 89b carried by the pawl arm 89a, thereby moving the pawl to engage the one pawl pallet 89d into engagement with the toothed wheel 90 and it is retained in said position by the engagement of the detent roller 91a with an end notch in the detent arm 92, the pawl during the movement of the lever 87 in one direction imparting movement to the toothed wheel 90 and through its shaft actuating the scraper gate adjusting shaft 73, 73" and effecting adjustment of said scraper gate to permit of an increased delivery of material to the conveyor. As the pawl arm approaches the termination of its toothed wheel advancing movement the roller 89b carried thereby will engage the fixed stop 94' opposite the trip 93 and thereby move the pawl out of engagement with the toothed wheel and maintain it in such position during the return movement of the pawl by the detent roller 91a engaging the intermediate notch of the detent arm 92, and as the pawl approaches the end of said latter movement the roller 89b will again engage the trip 93 and move the pawl into operative relation with the toothed wheel 90 and effect rotation thereof upon the successive movement of the pawl. This connection between the pawl 89 and the wheel is maintained until the scraper gate is adjusted to effect the delivery of a sufficient quantity of material to the conveyor to be counterbalanced by the counterpoise and the weighing mechanism is brought into equilibrium, and as the weighing mechanism is brought into equilibrium the lever adjusting wheel 95 will be brought to its normal position by the springs 95b moving the trips 93 93' to positions out of the path of travel of the roller 89b carried by the pawl arm.

Should the weighing mechanism be moved to overload position movement will be imparted to the drum 76 in reverse direction and by the movement therewith of the rack 76a meshing with the pinion 95c the shaft 95' will be rotated in reverse direction imparting forward movement to the wheel 95 through the engagement of the wheel studs 95d in the cam slots 96 rocking the lever 93a carrying the trip 93' and positioning the same in the path of movement and for engagement by the roller 89b carried by the pawl arm, and as said roller engages with the trip the pawl will be adjusted to engage the pawl pallet 89c with a tooth of the wheel 90 and upon movement of the pawl carrying rocker 87 away from the trip 93' movement will be imparted to the wheel 90 and shaft 86 to actuate the scraper gate adjusting shaft 73, 73" to adjust the gate to decrease the delivery of material to the conveyor until the weighing mechanism is brought into equilibrium, when the adjusting wheel 95 for the trip levers 93a is adjusted to position the trips out of the path of movement of the roller 89b of the pawl arm and by the engagement of said roller with the stop 94' opposite the trip 93' the pawl is moved to position with the pawl pallets out of engagement with the toothed wheel 90 and is retained in said position by the detent 91 until such time as there may be a decrease or increase in the delivery of material delivered to the conveyor and a movement of the weighing mechanism out of equilibrium.

In Figures 22 to 26, inclusive, there is illustrated a modified arrangement of means, and which may constitute the preferred means, for effecting the coupling of the actuating means 87 with the operating means for the scraper gate 72. In this arrangement a plate 97 is connected at the ends with the carrying heads 79' for the drum 76 to extend below and parallel with the drum and participate in the axial movement thereof. This plate has a longitudinal slot 97' therein having a cam portion 97a intermediate the ends. The carrying levers 93a for the trips 93, 93' are fixed to a shaft 98 rotatably mounted in the ends of the legs of the bifurcated member 94. Upon an extended end of said shaft there is fixed an arm 98' to which is pivotally connected at one end a link 98a, said link being slidably supported by a bracket 98b and carries a roller 98c engaging the plate cam 97a. With the conveyor transporting a quantity of material of the predetermined weight and the weighing mechanism thereby maintained in equilibrium the roller 98c engages intermediate the cam portion 97a of the slot and the trips 93, 93' in position out of the path of travel of the roller 89b carried by the pawl arm 89a, as shown in Figure 22. Should the weighing mechanism be moved to underload position the drum 76 will be caused to be moved longitudinally through the adjustment of the friction disk 84 and the roller 98c carried by the trip actuating link 98a to engage in a straight portion of the plate cam 97', as shown in Figure 25, and thereby effect a rocking of the trip carrying shaft 98 and positioning of the trip 93 in the path of movement of and for engagement by the roller 89b of the pawl arm 89a and an adjustment of the pawl 89 to engage the pawl pallet 89d with the toothed wheel 90 and actuation of the wheel and the scraper gate adjusting shaft 73, 73" by the oscillation of the actuating arm 87 as hereinbefore described. Should the weighing mechanism be moved to overload position the plate 97 will be adjusted with the drum 76 to cause the link roller 98c to engage the straight portion of the plate slot 97' at the opposite side of the cam portion 97a, as shown in Figure 26, and a rocking of the shaft 98 to position the trip 93' in the line of movement of and for engagement by the roller 89b of the pawl arm 89a and an adjustment of the pawl 89 to engage the pawl pallet 89c with the toothed wheel 90 and actuation of said wheel and the scraper adjusting shaft 73, 73" as hereinbefore described.

To integrate the cumulative weight of material transported by the conveyor there is provided means, comprising (Figures 3, 6, 9, 10 and 29) an indicator dial 99 fixed to the hub of a wheel 99a rotatably mounted in the casing F with a peripheral portion of the dial exposed through a window 99' in the housing, said dial being calibrated or graduated to indicate a predetermined unit of weight upon a complete revolution and fractions thereof, such as tons and pounds, and a counter or register, shown in a conventional manner at 100, which counter is of the usual construction embodying disks or wheels rotatably mounted in a casing having circumferentially disposed digits exposed through windows in the casing and the casing mounted in the housing F and exposed through a window 100' therein. The counter is actuated from the dial 99 upon each revolution thereof by a gear 99b fixed upon the hub of wheel 99a meshing with a pinion 100a rotatable with the prime mover of the counter.

The integrating means is actuated upon each successive predetermined length of conveyor travel to integrate the predetermined weight of the material carried thereby. This means comprises a rod 101 pivotally mounted at one end upon the eccentric pivot pin of the link 88 upon the disk 88'' and having a lost motion connection with a wheel 102 by a stud 102' fixed in and extended from the side of said wheel engaging a slot 101' in the rod. The wheel 102 is fixed to a shaft 102a upon which the dial carrying wheel 99a is rotatably mounted. The wheel 102 is urged and rotated in one direction by a spring 102b attached at one end to the stud 102' and at the opposite end to a pin fixed in the rod 101, and is moved in the opposite direction through the connection of the stud 102' with the rod.

Means are provided to couple the dial carrying wheel 99a with the wheel 102 during the movement imparted to the latter by the spring 102b and to release the wheel 102 from said dial carrying wheel during the retrograde movement thereof imparted thereto by the rod 101. This may be any suitable coupling means and is shown as comprising a head 103 rotatable with wheel 102 pivotally carrying a pawl 103' on a stud fixed in an arm extended radially from the head, as at 103a, whereby the pawl will overhang a peripheral portion of the wheel 99a, the head also having a counterweight 103b substantially diametrically opposite to the arm 103a. The periphery of the dial carrying wheel 99a is substantially of inverted V shape in cross section, and the pawl 103' has a correspondingly formed recess in the end to straddle the periphery of said wheel, as shown in Figure 10. The pawl is of a length somewhat greater than the distance between the pivot support of the pawl and the periphery of the wheel 99a, whereby the pawl will be inclined to a line extended through the axes of said wheel and the pawl pivot, as shown in Figure 9. By this arrangement as the head 103 is moved in one direction by the spring 102b the pawl will be frictionally impinged upon the periphery of the wheel 99a thereby coupling the head with and transmitting the movement thereof to the wheel, and as the head is moved in reverse direction through the rod 101 the pawl will be readily released from said wheel.

To control the actuation of the integrating means proportionally with the predetermined weight of the quantity of material transported by the successive predetermined lengths of conveyor travel and to which the counterpoise 59 has been set upon the beam 56 of the weighing mechanism, adjustable means are provided to control the connection of the dial carrying wheel 99a with its actuating pawl carrying head 103. This means, as shown in Figures 9, 10 and 19 to 21, comprises a slide 104 slidably supported adjacent opposite ends to have reciprocatory movement in brackets 104' mounted upon the wall of and within the casing F. Movement is imparted to said slide in one direction from and by the rotation of the pawl carrying head 103 by a pair of straps 105 secured at one end to an intermediate portion of increased width of the slide, as at 105', and at the opposite ends at 105a with the wheel 102, and movement is imparted to the slide in the opposite direction from the pawl carrying head by a strap 106 connected at one end to the opposite end of the enlarged portion of the slide intermediate the straps 105, as at 106', and connected at 106a at the opposite end to the wheel 102. The movement of the slide in one direction imparted thereto by the rotation of the pawl carrying head by the spring 102b is limited and thereby limiting the rotation of the pawl carrying head and the connection of said head with the dial carrying wheel 99a by a calibrated gauge stop for the slide, in the form of an eccentric or cam member 107 fixed to the shaft 67', of the adjusting means for the counterpoise and weight indicator dials 60. The pawl carrying head 103 is moved in one direction by the rod 101 to a predetermined position controlled by the connection of the rod with the disk 88'', and the dial actuating movement of said wheel and head is varied by the engagement of the slide 104 with, and in accordance with the adjustment of, the calibrated gauge stop 107 with the counterpoise 59 of the weighing mechanism and the adjustment of the weight indicator 60, and said latter movement of the pawl carrying head is permissible due to the lost motion pin and slot connection between said head and the rod 101. In Figure 19 the pawl carrying head 103 is shown as having been moved to one of its extreme positions by the rod 101, and in Figure 20 as having been moved in the opposite direction by the spring 102b with the slide engaging the gauge stop thereby limiting the movement of the pawl carrying head in said direction. In this position the rod connecting pin 102' engages the end wall of the rod slot and by the continued movement of the rod through the rotation of the disk 88'', as shown in dotted lines, the rod will be released from the pawl carrying head the rod connecting pin moving in the rod slot, and as the rod moves from said dotted line position to the position shown in Figure 21 the rod connecting pin will again be engaged by the end wall of the rod slot and movement will be imparted to the pawl carrying head and the connected wheel 102 thereby moving the slide 104 in a direction away from the gauge stop 107.

Assuming the counterpoise 59 has been set to counterbalance a quantity of material of predetermined weight on the portion of the conveyor supported by the weighing mechanism and a quantity of material to be transported by each successive predetermined length of conveyor travel to be 140 pounds, as indicated by the weight indicator 60 in the present instance in Figure 9. One to and fro movement or reciprocation is imparted to the slide 104 and a corresponding to and fro movement or oscillation is imparted to the pawl carrying head 103 upon each of said predetermined lengths of conveyor travel through the connection of the disk 88'' with the conveyor driving means as hereinbefore described. By the adjustment of the calibrated gauge stop 107 proportionally with the setting of the counterpoise weight 59, and the engagement of the slide 104 with said stop, the connection of the actuating means with the integrating means is controlled, whereby there will be imparted to the dial 99 a movement to indicate 140 pounds, and upon a complete revolution of said dial, indicative of one ton, the register 100 will be actuated to indicate multiples of said unit of weight or tons, the dial indicating fractions of a ton, and a reading or indication as to the number of tons and fractions thereof of material transported by the conveyor may be ascertained at any time.

In Figure 29 an embodiment of the cumulative weight integrating means is shown in connection with a simplified arrangement of material feeding means wherein the supporting roller 51 for a portion of the conveyor C is rotatably carried at one end of a lever 108, the opposite end of the lever being connected by a link 108' to the end of a weighing lever or beam 109, said end of the weighing lever carrying an adjustable counterpoise 109' and the opposite end connected to a gate 110 to regulate the outlet and delivery of material from the hopper H to the conveyor. The counterpoise 109' is adjustable to counterbalance different quantities of material of predetermined weight on the portion of the conveyor supported by the weighing lever. Should the weighing lever be moved to underload or overload positions by a decrease or increase in the weight of the material transported by the conveyor, the lever will effect adjustment of the gate 110 to increase or decrease the delivery of material from the hopper to the conveyor. The cumulative weight integrating means and the actuating means therefor is the same as that hereinbefore described with the exception that the disk 88" is in the form of a gear meshing with and driven from a gear 111 driven from the conveyor, as by a sprocket chain 112 passing around a sprocket wheel mounted on the shaft of the conveyor drum D and a sprocket wheel rotatable with the gear 111. The cumulative weight integrating means is actuated upon each revolution of the wheel 88" and one revolution is imparted to said wheel upon each predetermined length of conveyor travel. The calibrated gauge stop for engagement of the slide 104 is in the form of a plate 107' slidably carried by the register enclosing casing to have adjustment transversely of the movement of the slide and having a link connection 113 with the counterpoise weight 109' to participate in the adjustment of the counterpoise to adjust the gauge stop proportionally with the adjustment of the counterpoise. The conveyer in said arrangement may be driven from power means as hereinbefore described connected with the conveyer drum D. As shown the conveyer is driven by a sprocket chain 114 passing around a sprocket wheel 115 rotatable with the conveyer drum D' and a sprocket wheel on a drive shaft 116 driven from a suitable source of power by a belt 117 passing around a pulley 118 on the shaft 116.

In Figures 30 to 35 I have shown a modification of the means, and which may constitute the preferred means, for actuating the cumulative weight integrating means. In said arrangement the wheel 99a is in the form of a toothed or ratchet wheel, which is intermittently actuated, and thereby the dial 99, an extent proportional to the weight of the load or material transported by a predetermined length of conveyer travel, by the pawl 103 carried by the head arm 103a, and the counter or register 100 is actuated from the dial by the gear 99b rotatable with the dial meshing with a gear 100a, the movement of which is transmitted to the prime mover of the counter 100 in the manner set forth in connection with the arrangement illustrated in Figures 9 and 10 with the exception that the head 103 instead of being oscillated is continuously rotated and driven from the shaft 82', which drives the gear train for rotating the friction drum 76, by a pinion 120 on said shaft meshing with an intermediate gear 120' meshing with a gear 120a rotatable with the head 103 on the shaft 102a. The pawl 103' instead of being directly carried by the arm 103a of the head is carried by the hub of a lever pivotally mounted on a stud 121 fixed in and extending laterally from the head arm, the arms 121a, 121b of which lever extend oppositely from the hub and the pawl extending from the hub in angular relation to the lever arms and overhanging the ratchet wheel 99a, the lever being urged in a direction to engage the pawl with the teeth of the ratchet wheel, as shown in dotted lines in Figure 32, by a spring 122. The pawl carrying head 103 is rotated in predetermined ratio to the travel of the conveyer whereby a constant angle of rotation, in the present instance one revolution, is imparted to said head upon each predetermined length of travel of the conveyer, and the pawl is maintained in engagement with the ratchet wheel to couple the ratchet wheel with the rotatable head and thereby advance the dial of the integrating means to indicate the weight of material transported by each of said predetermined lengths of conveyer travel to which the counterpoise weight 59 is adjusted on the beam 56 and as indicated by the indicator dials 60, the movement of the dial 99 being transmitted through the gear 99b rotatable therewith to the gear 100a meshing therewith and connected with the prime mover of the register 100. For this purpose the pawl is normally maintained out of engagement with the ratchet wheel by a latch 123 loose on a stud 124 rotatably mounted by anti-friction bearings 124' in the head arm 103a adjacent the free end of the lever arm 121a, as shown at 124' in Figures 32 and 33. The latch is urged in a direction toward the lever arm 121a by a spring 123' coiled about and secured at one end to the stud 124 and at the opposite end to the latch to engage a lip of the latch with a lateral projection adjacent the end of said lever arm, as at 123a, to retain the lever in position with the pawl out of engagement with the ratchet wheel, as shown in full lines in Figure 32, such movement of the latch being limited by an ear of the latch engaging a pin fixed in the head arm 103a, as at 123b. The lever is moved against the tension of the spring 122 to move the pawl out of engagement with the ratchet wheel and to position the lever arm for engagement of the latch at a predetermined point in the travel of the head arm by a roller 126c carried by a stud fixed in and extending laterally from the lever arm 121b engaging and riding along an arcuate edge of a plate 125 adjustably mounted on brackets 125' fixed to a side wall of the housing F by bolts engaging elongated slots 125a in the plate and threaded into the brackets.

The arm carrying head 103 rotates in the direction indicated by the arrow a in Figure 30 and the latch is released from the lever arm 121a at a predetermined point in the travel of the latch with the head arm 103a toward the plate 125 by a finger 126 fixed to the stud 124 engaging a trip 127 extending into the path of travel of said finger, said trip being carried by a stud 127' fixed in and extending laterally from an arm 127a secured to a gear 128 and rotatable with said gear on the shaft 102a. The finger 126 is urged to position to extend radially of the axis of the arm carrying head 103 and in position to engage the trip by a spring 126' attached to the finger and said head. The movement of the finger is transmitted to lever arm releasing movement of the latch against the tension of the spring 123' by a pin carried by an arm fixed to the stud 124 engaging the latch, as shown at 124a in Figure 35. As the latch is released from the lever arm the lever is moved by the spring 122 to engage the pawl with the ratchet wheel and such engagement is maintained until the roller 126c carried by lever arm 121b engages the plate 125. The trip carrying arm 127a and thereby the trip is adjusted relative to the plate proportionally to and simultaneously with the adjustment of the poise weight on the scale beam 56 and the setting of the indicator dials 60 by a gear 129 fixed to the shaft 67' meshing with the gear 128. The trip as well as the indicator dials 60 and counterpoise weight are retained in adjusted position by a yielding detent engaging a toothed wheel rotatable with the key actuated shaft 71', as shown at 130 in Figure 30.

Having thus described my invention, I claim:

1. The combination of weighing mechanism having load receiving means and adjustable counterpoise to counterbalance loads of predetermined weight applied to the load receiving means, means to deliver material to the load receiving means, means to integrate the cumulative weight of material delivered to the load receiving means, means operative from the load receiving means to actuate the integrating means, and means to automatically effect adjustment of the actuating means for the integrating means simultaneously with the adjustment of the counterpoise.

2. The combination of weighing mechanism having adjustable counterpoise to balance a load of predetermined weight, means to deliver material to the weighing mechanism, means controlled by the weighing mechanism to regulate the delivery means to deliver material to the weighing mechanism proportionally to the predetermined adjustment of the counterpoise to maintain the weighing mechanism in balance, integrating means, means to actuate the integrating means to integrate the cumulative weight of the successive increments of material of predetermined weight delivered to the weighing mechanism, and means operative to adjust the actuating means for the integrating means simultaneously with the adjustment of the counterpoise to effect delivery of quantities of material of different predetermined weight to the weighing mechanism and operation of the actuating means for the integrating means to integrate the cumulative weight of such material.

3. The combination of weighing mechanism having adjustable counterpoise to counterbalance loads of predetermined weight successively applied to the weighing mechanism, means to integrate the cumulative weight of the successive weighings, means to actuate the integrating means, comprising a wheel rotatable with an element of the integrating means, a member continuously rotatable about the axis of said wheel adapted to have one revolution imparted thereto upon the weighing of each load, means to couple said member with and transmit the movement thereof to the wheel and actuate the integrating means, and means to uncouple said member from the wheel upon a predetermined angle of rotation thereof and thereby advance the integrating means proportionally with the predetermined weight on the load weighed, and means to effect adjustment of said uncoupling means simultaneously with the adjustment of the counterpoise.

4. The combination of weighing mechanism having adjustable counterpoise to counterbalance loads of predetermined weight applied to the weighing mechanism, means to deliver material to the weighing mechanism, means including a register to integrate the cumulative weight of the successive weighings comprising a rotatable toothed wheel operatively connected with the integrating means, a member juxtaposed to and continuously rotatable about the axis of the wheel and having one revolution imparted thereto upon each weighing, a pawl carried by and revoluble with said member about the wheel and urged to engage a tooth of and couple the wheel with said rotatable member, means to normally retain the pawl out of engagement with the toothed wheel, means adjustable about the wheel in the path of travel of the pawl retaining means and adapted to actuate said means at a predetermined point in the rotation of the pawl carrying member to release the pawl for engagement with the wheel, and means at a fixed point in the rotation of said member to move the pawl out of engagement with the wheel and relative to the means to retain it out of engagement with the wheel.

5. The combination of weighing mechanism having adjustable counterpoise to counterbalance loads of predetermined weight applied to the weighing mechanism, means to deliver material to the weighing mechanism, means to integrate the cumulative weight of the successive weighings comprising a rotatable toothed wheel operatively connected with the integrating means, a member juxtaposed to and rotatable about the axis of said wheel, a lever pivotally carried by said member adjacent the periphery of the wheel, a pawl carried by said lever to overhang and adapted to engage a tooth of the wheel to couple the rotary member with and transmit the movement thereof to the wheel and advance the register, means to yieldingly urge the lever in a direction to engage the pawl with a tooth of the wheel, a latch carried by the rotatable member to normally retain the lever in position with the pawl out of engagement with the wheel, a trip for engagement and releasing of said latch from the lever to permit the lever to move and engage the pawl with a wheel tooth at a predetermined point in the revolving movement of the pawl about the wheel, and fixed means at a predetermined point in the rotation of said member for the engagement and actuation of the lever to move the pawl out of engagement with the wheel and the lever relative to the latch to retain the lever in position with the pawl out of engagement with the wheel.

6. In weighing mechanism as claimed in claim 5, means to adjust the counterpoise to weigh successive loads of different predetermined weight and simultaneously adjust the pawl trip about the wheel relative to the fixed means to maintain the wheel coupled with the pawl carrying member and effect actuation of the integrating means proportional with the adjustment of the counterpoise and the weight of the weighed load.

7. The combination with a material transporting conveyer, of weighing mechanism having adjustable counterpoise to counterbalance a load of predetermined weight transported by the conveyer, means to deliver material in quantities of predetermined weight to the weighing mechanism, means to integrate the cumulative weight of the material transported by the conveyer, means operative upon each predetermined length of conveyer travel to actuate said integrating means, and means adjustable by the adjustment of the counterpoise to control the operation of the actuating means for and operation of the integrating means.

8. The combination with a material transporting conveyer, of adjustable means to deliver material in regulated volume thereto, weighing mechanism including a weighing beam having adjustable counterpoise to counterbalance loads of predetermined weight transported by the conveyer, means operative from the weighing mechanism to control the material delivery means to regulate the delivery of material to the conveyer, means to integrate the cumulative weight of the successive weighings, means intermittently operative upon each predetermined length of conveyer travel to actuate the integrating means, and means adjustable with and proportional to the adjustment of the counterpoise to control the operation of the actuating means for the integrating means and thereby the operation of the weight integrating means proportional to the weight of the material transported by each successive length of the conveyer travel.

9. The combination with a material transporting conveyer, of weighing mechanism having adjustable counterpoise to counterbalance loads of predetermined weight upon the conveyer, means to integrate the cumulative weight of the material transported by the conveyer adapted to register in multiples of a predetermined unit of weight and parts thereof, means operative upon each predetermined length of conveyer travel to actuate the weight integrating means, comprising a rotatable member driven from the conveyer and having a constant angle of rotation imparted thereto upon each predetermined length of conveyer travel, a rotatable wheel operatively connected with the integrating means, a member oscillatory about the axis of said wheel normally urged in one direction and having an operative connection with and moved in the opposite direction by the rotatable member and adapted to be coupled with and transmit the movement thereof to the wheel and actuate the integrating means during the movement thereof in one direction, and means adjustable with and proportional to the adjustment of the counterpoise to regulate the movement of the oscillatory member.

10. The combination with a material transporting conveyer and means to deliver material thereto, of weighing mechanism including a weighing beam arranged with means to control the delivery means to regulate the delivery of material to the conveyer, a counterpoise adjustable on the beam to counterbalance loads of predetermined weight transported by the conveyer, means to integrate the cumulative weight of material transported by the conveyer and indicate the weight in multiple, of a predetermined unit of weight and parts thereof, a wheel operatively connected with the integrating means, a member oscillatory about the axis of said wheel, means to yieldingly urge said member in one direction and adapted to engage and transmit said movement thereof to the wheel and actuate the integrating means, a gauge stop adjustable with and proportional to the adjustment of the counterpoise on the beam, an abutment oscillatory with the movable member engageable with the stop gauge to limit the movement imparted to said member by the yielding means and disconnect the same from the wheel, and means operative from the conveyer having a lost motion connection with the oscillatory member to transmit a constant angle of rotation to said member in the opposite direction upon each predetermined length of conveyer travel.

11. The combination of a material transporting conveyer, adjustable means to deliver material thereto, weighing mechanism having counterpoise adjustable to counterbalance loads of predetermined weight transported by the conveyer, an indicator to indicate the predetermined weight of a load to be delivered to and transported by successive lengths of conveyer travel, means to adjust the counterpoise to counterbalance loads of different predetermined weight transported by each successive length of conveyer travel and simultaneously set the indicator to indicate the weight of the load to be successively weighed, and means operative by the movement of the weighing mechanism to overload or underload positions to automatically adjust the material delivery means to deliver material to the conveyer proportionally with the weight indicated by the indicator.

12. The combination with a material transporting conveyer and means to deliver material thereto, of weighing mechanism having counterpoise adjustable to counterbalance loads of predetermined weight transported by the conveyer, an indicator to indicate the predetermined weight of material to be transported by successive lengths of conveyer travel, means to adjust the counterpoise to counterbalance material transported by the successive lengths of conveyer travel of different predetermined weight and simultaneously set the indicator to indicate said weight, means operative by and upon each successive predetermined length of conveyer travel to integrate the cumulative weight of material transported by the conveyer, and means set by the counterpoise adjusting means simultaneously with the adjustment of the counterpoise to control the actuation of said integrating means proportionally with the weight of the material transported by the successive lengths of conveyer travel.

13. The combination of a material transporting conveyer, adjustable means to deliver material thereto, weighing machanism including a weighing beam having a conveyer support connected thereto, a counterpoise weight adjustable on the beam to counterbalance a quantity of material of predetermined weight to be delivered to and transported by successive predetermined lengths of conveyer travel, an indicator to indicate the predetermined weight of material to be delivered to and transported by successive lengths of conveyer travel, means connected with the indicator and counterpoise operative to set the indicator to indicate the weight of material to be delivered to successive lengths of conveyer travel and proportionally adjust the counterpoise weight on the beam to counterbalance the weight of material indicated by the indicator to be delivered to and transported by successive lengths of conveyer travel, means to integrate the cumulative weight of material transported by the conveyer, means operative from the conveyer to actuate the integrating means upon each predetermined length of conveyer travel, and means controlled from the actuating means for the integrating means operative to adjust the material delivery means to deliver material to the conveyer proportionally with the weight indicated by the indicator.

14. The combination with a material transporting conveyer and means to deliver material thereto, weighing mechanism including a weighing beam having a conveyer support connected thereto, a counterpoise weight adjustable on the beam to counterbalance a load of predetermined weight on the conveyer, an indicator to indicate the weight of the load to be balanced by the weighing mechanism, a slidably supported rack connected with the counterpoise manually movable to adjust the counterpoise on the beam, a pinion having an operative connection with the load indicator and meshing with the rack, and the manual rotation of said pinion being adapted to set the load indicator and proportionally adjust the counterpoise on the beam to counterbalance a load having a weight indicated by the load indicator and to be transported by predetermined successive lengths of conveyer travel, means to integrate the cumulative weight of the material transported by the conveyer, means to actuate said integrating means upon each predetermined length of conveyer travel, and means operatively connected with and set by the rack simultaneously with the adjustment of the counterpoise and setting of the load indicator to control the operation of the actuating means for and operation of the integrating means proportionally with the weight of the successive loads transported by the conveyer.

15. The combination with a material transporting conveyer, of weighing mechanism including a weighing beam having a conveyer support connected thereto and counterpoise adjustable thereon to counterbalance a load of predetermined weight on the conveyer, an indicator to indicate in a predetermined unit of weight the weight of the material to be transported by the conveyer each predetermined unit of time, means to integrate the cumulative weight of material transported by the conveyer during the successive units of time, means to regulate the operation of said integrating means proportionally with the weight of the successive loads transported by the conveyer, and means to simultaneously adjust the counterpoise, set the indicator to indicate the weight of material to be transported by the conveyer each predetermined unit of time and the means to regulate the operation of the means to integrate the cumulative weight of material transported by the conveyer.

16. The combination with a material transporting conveyer, of weighing mechanism arranged with a conveyer support and having counterpoise adjustable to counterbalance a quantity of material of predetermined weight transported by the conveyer, means to integrate the weight of the cumulative quantity of material transported by the conveyer, means to actuate said integrating means upon each predetermined length of conveyer travel, an adjustable gauge stop to regulate the operation of said actuating means for the integrating means and actuate the integrating means proportionally with the weight of material transported by successive lengths of conveyer travel, and means to adjust the counterpoise to counterbalance quantities of material of different weight transported by the conveyer and set the gauge stop to regulate the operation of the actuating means for the integrating means proportional with the adjustment of the counterpoise.

17. In material feeding means, the combination of a material transporting conveyer, weighing mechanism arranged with a conveyer support and having adjustable counterpoise to counterbalance a quantity of material of predetermined weight transported by the conveyer, means to integrate the cumulative weight of the material transported by the conveyer, an oscillatory member having a constant angle of rotation imparted thereto upon each predetermined length of conveyer travel, means operative upon each predetermined length of conveyer travel to connect the integrating means with said member to actuate the integrating means, and an adjustable calibrated stop to limit said connection of the integrating means with said member and the actuation of the integrating means proportionally to the weight of the material transported by each predetermined length of conveyer travel.

18. In material feeding means, the combination of a travelling conveyer and actuating means therefor, means to deliver material to one end of said conveyer, means to receive material transported by and delivered from the opposite end of the conveyer, weighing mechanism including a beam arranged with conveyer supporting means and counterpoise adjustable thereon to counterbalance loads of different predetermined weight transported by the conveyer, means independent of the weighing mechanism to regulate the delivery of material to the conveyer, means operative from the conveyer actuating means to adjust the delivery regulating means and normally disconnected therefrom, means controlled by the movement of the weighing mechanism to overload and underload positions by an increase or decrease in the predetermined weight of the material transported by the conveyer to couple said adjusting means with said actuating means to effect adjustment of the delivery regulating means and delivery of material to the conveyer to bring the weight of the material into balance with the weighing mechanism, and means to integrate the cumulative weight of material transported by the conveyer.

19. In a material feeding means as claimed in claim 18, means operative upon each successive predetermined length of conveyer travel to actuate the means to integrate cumulative weight, regulatable means to control the operation of said register actuating means, and means to adjust the counterpoise to counterbalance loads of different predetermined weight and proportionally adjust the regulatable means to control the operation of the actuating means for and operation of the integrating means.

20. The combination with a material transporting conveyor, of weighing mechanism having conveyer supporting means and adjustable counterpoise to counterbalance loads of different weight on the conveyer, means to totalize and register the weight of material transported by successive predetermined lengths of conveyer travel, a rotatable wheel operatively connected with the prime mover of the registering means, a member juxtaposed to and oscillatory about the axis of said wheel, means operative from the conveyor to intermittently transmit a constant angle of rotation to said member in one direction upon each predetermined length of conveyer travel and proportionally to the weight of the load on the conveyer, means to yieldingly urge said member to predetermined position in the opposite direction, means to couple the oscillatory member with the wheel at the end of the angle of rotation and maintain the wheel coupled with and transmit return movement of said member to the wheel and thereby advance the registering means, and means adjustable proportionally with the adjustment of the counterpoise to control the connection of the oscillatory member with the wheel.

21. The combination of a material transporting conveyer, means to deliver material to the conveyer, adjustable means to regulate the delivery of material to the conveyer, weighing mechanism arranged with conveyer supporting means and having adjustable counterpoise to counterbalance a quantity of material of predetermined weight to be transported by each successive length of conveyer travel, means having an operative connection with the means to regulate the delivery of material to the conveyer and controlled by the weighing mechanism to effect adjustment of the regulating means to decrease the delivery of material to the conveyer by the movement of the weighing mechanism to overload position and increase the delivery of the material to the conveyer by the movement of the weighing mechanism to underload position and indicate the variations from the predetermined load to be transported by successive lengths of conveyer travel, means to integrate the cumulative weight of the material transported by the conveyer, means operative upon successive predetermined lengths of conveyer travel to actuate said integrating means, and means to effect adjustment of the actuating means for the integrating means with the adjustment of the counterpoise to actuate the integrating means proportionally to the predetermined weight of the material transported by each length of conveyer travel and thereby integrate the cumulative weight of the material transported by the conveyer.

22. The combination of weighing mechanism having load receiving means and adjustable counterpoise to counterbalance material applied to the load receiving means of different predetermined weight, means to deliver material to the load receiving means, power means independent of the weighing mechanism, adjustable means operative from the power means and normally disconnected therefrom for regulating the delivery of material by the delivery means to the load receiving means, and means controlled by the movement of the weighing mechanism to overload or underload positions by variations in the weight of the material delivered to the load receiving means to connect and control the connection of said regulating means with the power means to adjust the regulating means to vary the delivery of material to the load receiving means proportional to said variations in the predetermined weight of material delivered to the load receiving means to bring the material on the conveyer into balance with the weighing mechanism.

23. The combination with a travelling conveyer and means to deliver material thereto, of weighing mechanism arranged with conveyer supporting means and adjustable counterpoise to counterbalance material of predetermined weight upon the conveyer, a scraper supported to extend transversely above and have adjustment toward and away from the conveyer to regulate the quantity of material transported by the conveyer proportional to the adjustment of the counterpoise to bring the weight of the material on the conveyer into balance with the weighing mechanism, power means independent of the weighing mechanism, and means operative from the power means to effect adjustment of the scraper, said means being normally disconnected from the power means and inactive by the transporting of a quantity of material of predetermined weight by the conveyer and connected with the power means and rendered active to adjust the scraper and effect a decrease or increase in the quantity of the material transported by the conveyer by the movement of the weighing mechanism to overload or underload positions by variations in the predetermined weight of the material transported by the conveyer.

24. In material feeding means, the combination with a travelling conveyer and means to deliver material thereto, of weighing mechanism having adjustable counterpoise to support and counterbalance material of predetermined weight transported by the conveyer, a scraper supported to extend transversely above and have adjustment toward and away from the conveyer to regulate the quantity of material transported by the conveyer proportional with the adjustment of the counterpoise to bring the material on the conveyer into balance with the weighing mechanism, a rotatable shaft having an adjustable connection with the scraper to effect adjustment of the scraper toward and away from the conveyer by the rotation of the shaft, power means independent of the weighing mechanism, and means to couple the shaft with the power means to adjust the scraper controlled by the movement of the weighing mechanism to overload or underload positions.

25. In material feeding means, the combination with a travelling conveyer and means to deliver material thereto, of weighing mechanism arranged to support and counterbalance material of predetermined weight transported by the conveyer, a scraper supported to extend transversely above and have adjustment toward and away from the conveyer, a rotatable shaft having a connection with the scraper to effect adjustment of the scraper toward the conveyer by the rotation of the shaft in one direction and away from the conveyer by the rotation of the shaft in the opposite direction, power means independent of the weighing mechanism, and means to couple the shaft with the power means and normally uncoupled therefrom, said means being controlled by the movement of the weighing mechanism to overload or underload positions by variations in the predetermined weight of material transported by the conveyer to couple the shaft with the power means and adjust the scraper to decrease or increase the quantity of material transported by the conveyer proportional with said variations in the predetermined weight.

26. Material feeding means as claimed in claim 25, wherein the means to couple the scraper adjusting shaft with the power means comprises a wheel rotatable with the shaft, an arm oscillated on the shaft relative to the wheel from the power means, and means carried by said arm to engage and couple the arm with the wheel, said means being normally uncoupled from the wheel with the weighing mechanism in equilibrium by the transporting of a quantity of material of predetermined weight by the conveyer and adapted to be coupled with the wheel when the weighing mechanism is moved to overload position to rotate the wheel and scraper adjusting shaft in one direction and coupled with the wheel when the weighing mechanism is moved to underload position to rotate the wheel and scrapper adjusting shaft in the opposite direction.

27. The combination of weighing mechanism having adjustable counterpoise to counterbalance loads of predetermined weight successively applied to the weighing mechanism, means to integrate the cumulative weight of the successive weighings, means to actuate said integrating means comprising a wheel rotatable with an element of the integrating means, and means to impart a predetermined constant angle of rotation to said wheel and transmit said movement of the wheel to the integrating means.

28. The combination with a material transporting conveyer, of weighing mechanism having adjustable counterpoise to counterbalance loads of predetermined weight upon the conveyer, means to integrate the cumulative weight of the material transported by successive predetermined lengths of conveyer travel comprising a wheel rotatable with an element of the integrating means, and means operative from the conveyer upon each predetermined length of travel thereof to impart a predetermined constant angle of rotation to said wheel.

29. The combination of a material transporting conveyer, adjustable means to regulate the delivery of material thereto, weighing mechanism arranged to support a portion of the conveyer therefrom and having adjustable counterpoise to counterbalance material of predetermined weight on the conveyer, means operative from and upon successive predetermined lengths of conveyer travel to integrate the cumulative weight of the material transported by the conveyer, means controlled by the weighing mechanism to adjust the means to regulate the delivery of material to the conveyer and deliver material and weighed to bring the weighing mechanism into balance, adjustable means to control the operation of the integrating means, and means to adjust the counterpoise to vary the weight of the material transported by the conveyer to counterbalance the weighing mechanism and simultaneously adjust the controlling means of the actuating means for the integrating means proportionally with the weight of the material transported by the successive predetermined lengths of conveyer travel.

HERBERT L. MERRICK.